US012426134B2

(12) United States Patent
Fossati et al.

(10) Patent No.: US 12,426,134 B2
(45) Date of Patent: Sep. 23, 2025

(54) INTERLOCK SYSTEM WITH HINGE CONNECTION FOR APPLIANCE DOOR

(71) Applicant: WHIRLPOOL CORPORATION, Benton Harbor, MI (US)

(72) Inventors: Laura Fossati, Travedona (IT); Radhakrishna Pai Kizhakke Parambil, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 671 days.

(21) Appl. No.: 17/701,146

(22) Filed: Mar. 22, 2022

(65) Prior Publication Data

US 2022/0322503 A1 Oct. 6, 2022

Related U.S. Application Data

(60) Provisional application No. 63/168,630, filed on Mar. 31, 2021.

(51) Int. Cl.
*H05B 6/64* (2006.01)
*F24C 7/02* (2006.01)

(52) U.S. Cl.
CPC ............. *H05B 6/6417* (2013.01); *F24C 7/02* (2013.01)

(58) Field of Classification Search
CPC ........ F24C 7/02; F24C 15/022; F24C 15/023; F24C 15/14; H05B 6/6414; H05B 6/6417
See application file for complete search history.

(56) References Cited

U.S. PATENT DOCUMENTS

| | | | | |
|---|---|---|---|---|
| 3,898,412 | A | 8/1975 | Robinson et al. | |
| 3,995,899 | A | 12/1976 | Tippy et al. | |
| 10,352,073 | B2 | 7/2019 | Lee et al. | |
| 2009/0260409 | A1* | 10/2009 | Lee | F24C 15/022 70/278.7 |
| 2014/0197161 | A1 | 7/2014 | Dobie | |
| 2017/0298663 | A1* | 10/2017 | Lee | E05B 15/022 |
| 2018/0216832 | A1 | 8/2018 | White et al. | |

FOREIGN PATENT DOCUMENTS

| | | | |
|---|---|---|---|
| CN | 102395832 | A | 3/2012 |
| CN | 112444045 | A | 3/2021 |
| EP | 0650311 | A1 | 4/1995 |
| EP | 2408264 | A1 | 1/2012 |
| FR | 2449849 | A1 | 9/1980 |
| KR | 930005325 | Y1 | 8/1993 |
| WO | 2020043437 | A1 | 3/2020 |
| WO | 2020043438 | A2 | 3/2020 |

* cited by examiner

*Primary Examiner* — Hung D Nguyen
(74) *Attorney, Agent, or Firm* — Brooks Kushman, P.C.

(57) ABSTRACT

An oven door interlock system configured to selectively block a switch based on a position of an oven door may include a switch, a reference hinge attached to the oven door, the door movable between an open position and a closed position, and a locking mechanism connected to the switch via a rod, the locking mechanism including a hinge receiver connected to the reference hinge attached to the oven door, the reference hinge including a cam configured to move along a first axis in response to actuation at the oven door and to affect movement of the rod along a second axis perpendicular to the first axis on a position of the oven door to selectively block access to the switch when the oven door is in the open position.

20 Claims, 8 Drawing Sheets

INTERLOCK SYSTEM WITH HINGE CONNECTION FOR APPLIANCE DOOR

CROSS-REFERENCE TO RELATED APPLICATIONS

This application claims the benefit of U.S. provisional application Ser. No. 63/168,630 filed Mar. 31, 2021, the disclosure of which is hereby incorporated in its entirety by reference herein.

TECHNICAL FIELD

Aspects of the disclosure relate to an interlock system with a hinge connection for an appliance door.

BACKGROUND

Microwave ovens have doors that allow access to an inner cavity for cooking. The door may include at least two door interlocks, at least one of which is concealed from a user. However, the desire for larger cooking capacities require larger cavities and thus larger doors, or flat doors, requiring differing door plate designs than those of traditional microwaves.

SUMMARY

An oven door interlock system configured to selectively block a switch based on a position of an oven door may include a switch, a reference hinge attached to the oven door, the door movable between an open position and a closed position, and a locking mechanism connected to the switch via a rod, the locking mechanism including a hinge receiver connected to the reference hinge attached to the oven door, the reference hinge including a cam configured to move along a first axis in response to actuation at the door and to affect movement of the rod along a second axis perpendicular to the first axis on a position of the oven door to selectively block access to the switch when the door is in the open position.

In one example, the locking mechanism includes a lever configured to rotate about a pin in response to movement of the cam along the first axis in response to the cam abutting at least a portion of the lever.

In another embodiment, the rod is fixed to a first end of the lever opposite the pin.

In a further example, the lever includes at least one projection configured to abut the cam and force and cause rotation of the lever about the pin in response to the door being in an open or partially open position.

In one example, the cam includes a shaft and a step portion attached to the shaft.

In another embodiment, the hinge receiver defines a slot configured to receive the step portion and wherein the step portion of the cam is configured to translate across the slot about the first axis in response to actuation at the oven door.

In a further example, the locking mechanism includes a lever connected to the rod at a first end and having a projection and rotatably fixed to a pin at a second end.

In one example, the step portion is configured to abut the projection and rotate the lever to translate the rod along the second axis.

In another embodiment, the switch includes at least one switch cam configured to selectively engage with the rod where the rod is configured to block the at least one switch cam when the door is in an open position.

In a further example, the at least one switch cam includes a first switch cam and a second switch cam.

An oven door interlock system may include a locking mechanism connected to a switch via a rod, the rod configured to selectively block the switch based on a position of an oven door, the locking mechanism including a hinge receiver connected to a reference hinge attached to the oven door, the reference hinge including a cam configured to move along a first axis in response to actuation at the door and to affect movement of the rod along a second axis perpendicular to a first axis on a position of the oven door to selectively block access to the switch when the door is in the open position.

In one example, the reference hinge is attached and movable with the oven door, the door movable between an open position and a closed position.

In another embodiment, the locking mechanism includes a lever configured to rotate about a pin in response to movement of the cam along the first axis in response to the cam abutting at least a portion of the lever.

In a further example, the rod is fixed to a first end of the lever opposite the pin.

In one example, the lever includes at least one projection configured to abut the cam and force and cause rotation of the lever about the pin in response to the door being in an open or partially open position.

In another embodiment, the cam includes a shaft and a step portion attached to the shaft.

In a further example, the hinge receiver defines a slot configured to receive the step portion and wherein the step portion of the cam is configured to translate across the slot about the first axis in response to actuation at the oven door.

In one example, the locking mechanism includes a lever connected to the rod at a first end and having a projection and rotatably fixed to a pin at a second end.

In another embodiment, the step portion is configured to abut the projection and rotate the lever to translate the rod along the second axis.

In a further example, the switch includes at least one switch cam configured to selectively engage with the rod where the rod is configured to block the at least one switch cam when the door is in an open position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Microwaves and ovens, or combination ovens, may heat and cook food via magnetrons or heating elements. To protect users from exposure to heat, rays or electromagnetic waves, generated by these cooking elements, oven doors may require a minimum of two door interlocks to prevent cooking while the door of the oven is open. At least one of the interlocks may be required to be concealed and inaccessible to users so as to be tamperproof. Current ovens conceal the interlock via eyelids, rotational cams, etc. However, many of these mechanisms still allow the interlock to be accessible to users.

In some ovens, a door actuated switch may be used to prevent cooking while the door is open. That is, while the door is open, the switch is activated, thus preventing activation of the cooking elements. However, often times these require components to be interfaced with the door and may require openings to be made in the front frame of the oven. However, in the case of ovens that have front frames that act as capacitive channels, or ovens with larger doors to accommodate larger capacity ovens, openings at the front frame are not practical. Hinged receivers connected directly to the door are also not practical in these situations for similar reasons.

Disclosed herein is a door interlock system arranged on a door internal surface for actuating a switch upon door opening that includes a movable cam. The interlock system can be placed internal to the door, without requiring openings in the front frame. The interlock system includes an actuator arm or rod connected to a door hinge internal part configured to transform the rotational movement of the door into a vertical movement via a lever to block and unblock a switch. The hinge assembly includes a hinge connected to the cam, which moves horizontally when the door is opened and closed. The cam includes a projection or step that rotates the lever upon actuation of the cam. The lever forces the rod to move vertically to actuate the switch and disable the cooking elements.

Figure 1:
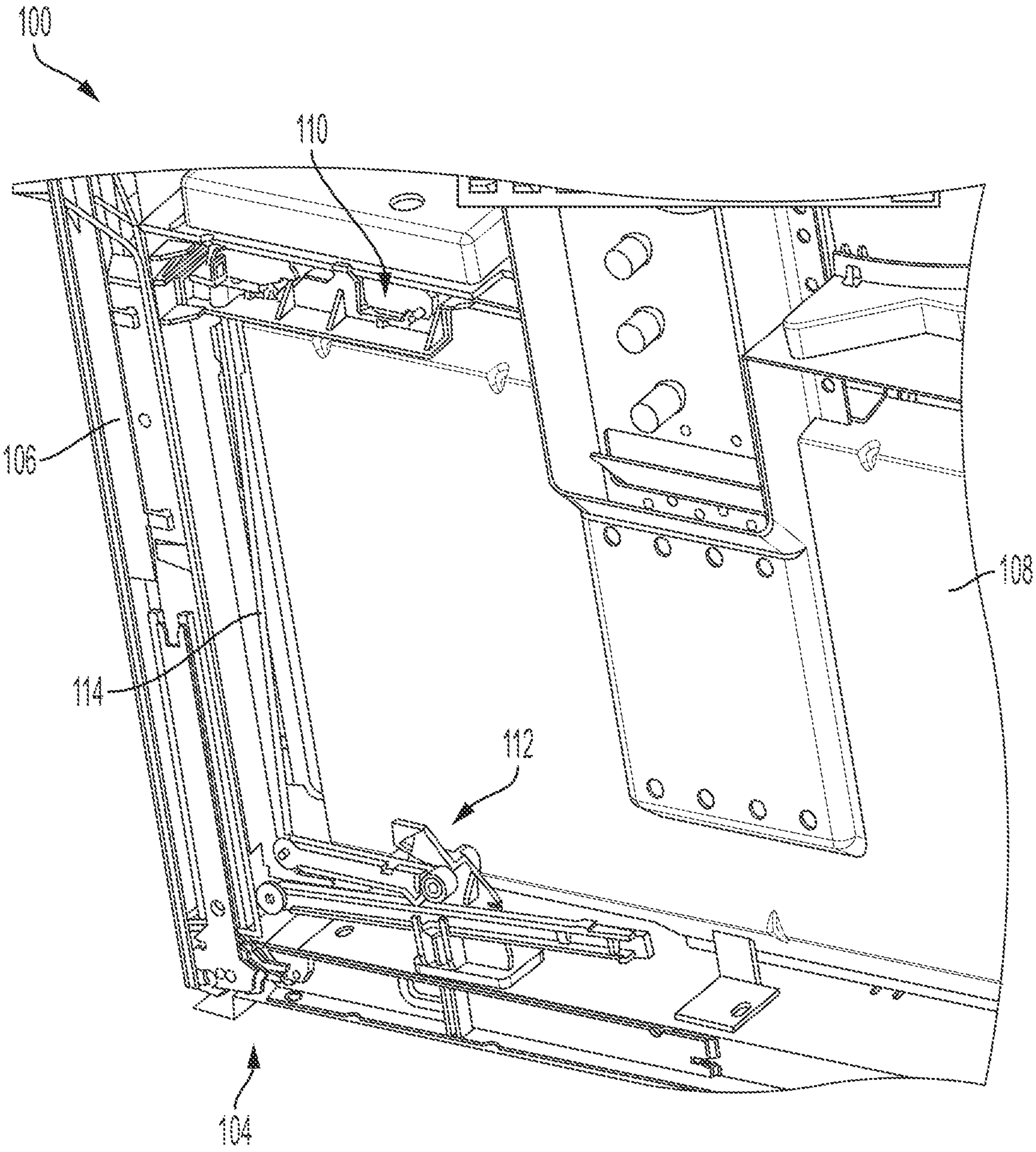
FIG. 1 illustrates a side perspective view of an oven, such as a microwave oven, having an interlock system.

FIG. 1 illustrates a side perspective view of an oven 100, such as a microwave oven, having an interlock system 104. Other types of ovens may also be included, such as conventional ovens, both freestanding and built-in ovens, electric ovens, gas ovens, convection ovens, steam ovens, air frying ovens, etc. In the specific examples herein, the oven may have a front frame that acts as a capacitive channel, though ovens without this feature may also be contemplated.

The oven 100 may include top, bottom, back and side walls forming a cavity with a door 106. The oven cavity 108 is configured to receive food items via an access opening at the door 106. The door 106 moves between an open position where the oven cavity 108 is accessible and a closed position where the door 106 seals the opening. To perform a cooking cycle, the food is placed in the oven cavity 108, the door 106 is closed, and a magnetron or heating element is activated. During operation, microwave energy travels from the magnetron through a waveguide and is distributed into the oven cavity. This energy transfers to the food via dielectric heating.

The oven cavity 108 may be made of a material such as stainless steel or ceramic enamel, to prevent the passage of the radiation outside of the oven cavity 108. The door 106 may include a clear window for observing the food, shielded by a metal mesh to prevent the passage of the radiation. Once the food is heated, the magnetron is deactivated, the door 106 is reopened, and the food is removed. The door 106 may be hinged along the bottom of the oven 100 with a handle arranged at the top of the door 106 opposite the hinge.

The oven 100 may include an interlock system 104 to protect against the inadvertent opening of the door 106 during oven operation. The interlock system 104 may detect whether the door 106 is open or closed, such that the magnetron or heating element is automatically deactivated should the door 106 be opened during a cooking cycle. The interlock system 104 may include a switch 110 arranged at or within the top of the oven 100. The switch 110 may be actuated by a rod 114 extending between the switch 110 and a locking mechanism 112. The rod 114 may include an inverted U-shaped type hook to block or unblock a trigger for the switch 110.

The locking mechanism 112 may be arranged at an opposite end of the door 106 from the switch 110, e.g., at or near the base of the door 106. While the switch 110 is illustrated at being at the top of the oven and the locking mechanism 112 is illustrated as being at the bottom, other reverse arrangements of the switch 110 and locking mechanism 112 may be possible. Further, the switch 110 and locking mechanism 112 may be arranged at opposite sides of the door 106. The arrangement of the switch and locking mechanism 112 may depend on the location of the hinge of the door 106.

When the door 106 is in a closed position, the locking mechanism 112 is in a rest position and the rod 114 is in a relaxed or lowered position. When the door 106 is in an opened position, the locking mechanism 112 translates to an active position and causes the rod 114 to move laterally upwards to activate the switch 110. When the switch 110 is activated, the switch 110 prevents any cooking elements from being operational and thus the oven 100 may not perform heating or otherwise run a cooking cycle while the door 106 is open.

Figure 2:
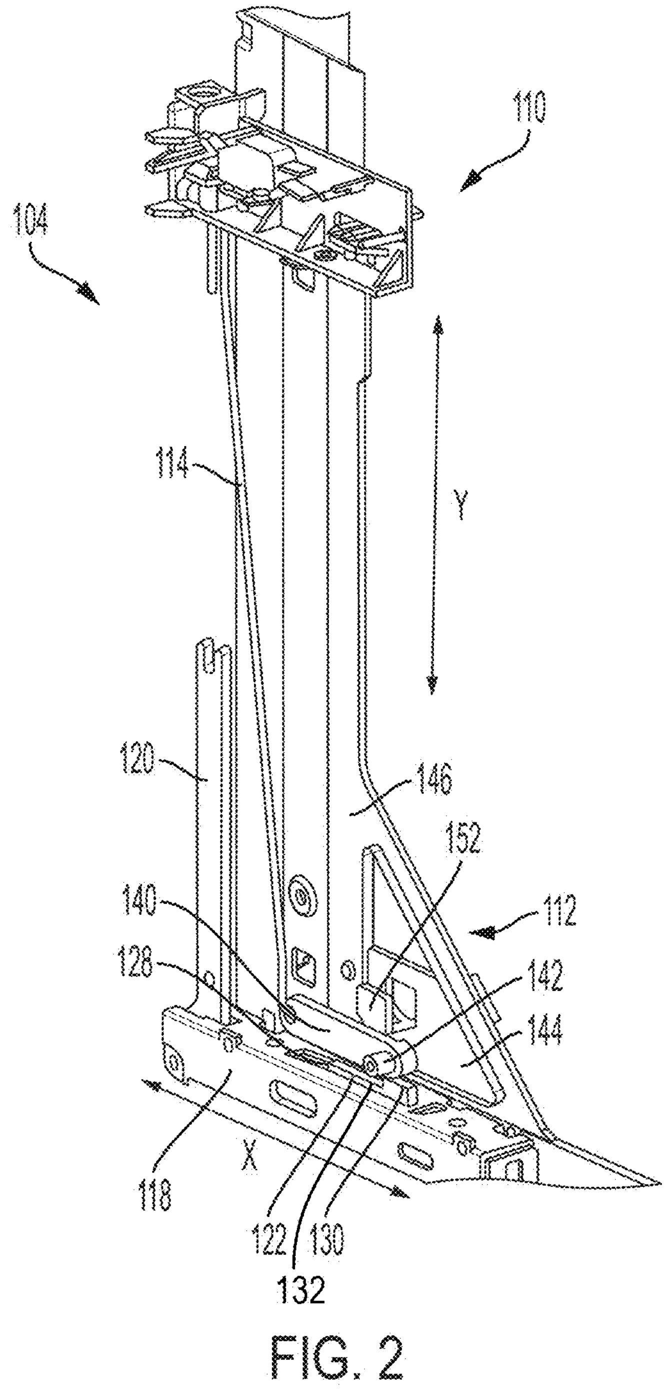
FIG. 2 illustrates an example interlock system having an locking mechanism and switch interconnected by a rod.

FIG. 2 illustrates an example interlock system 104 having the locking mechanism 112 and switch 110 interconnected by the rod 114. In the example shown in FIG. 2, the door 106 (not shown in FIG. 2) is in the closed position. The interlock system 104 may include a hinge receiver 120 pivotably connected to a reference hinge 118. The hinge receiver 120 is configured to interface with the door 106 and move relative to the door position. The hinge receiver 120 may be received by the reference hinge 118 and be configured to pivot with the reference hinge 118 with the movement of the door 106.

The reference hinge 118 may be a casing having a hallow interior and configured to receive a cam 122. The cam 122 may be arranged and housed within the reference hinge 118. The reference hinge 118 may define an opening 128 at a tope of the reference hinge 118. The cam 122, which is at least partially housed within the hallow interior of the reference hinge 118 may selectively extend, at least partially, through an opening 128 defined by the top of the reference hinge 118. The cam 122 may include a step portion 130 arranged at the end of a shaft 132. The step portion 130 may selectively extend out of the opening 128 while the shaft 132 is configured to be maintained within the reference hinge 118, though may be visible via the opening 128.

During operation, the cam 122 may be configured to move laterally along a first axis X in response to the position of the hinge receiver 120. As the hinge receiver 120 actuates or pivots at the reference hinge 118, the cam 122 may translate along the first axis X. That is, rotational movement caused by a change in the door position may be translated to lateral movement of the cam 122 through the reference hinge 118.

The cam 122 is configured to abut a lever 140. The lever 140 may be attached at a first end to the rod 114, and at a separate second end to a pin 142 of a bracket 144. The rod 114 is configured to move along the second axis Y with the lever 140. That is, when the first end of the lever 140 is elevated, the rod 114 is also elevated and actuates the switch 110.

The bracket 144 may be fixed to a support structure or frame 146 of the oven 100. The bracket 144 may fit within an opening of the frame 146 so as to take up less room and have a lower profile. The bracket 144 may be a plate-like bracket and have a notch 150 extending from the side facing the lever 140. The lever 140 may be configured to rotate about the pin 142. The lever 140 includes a projection 150 (as best illustrated in FIGS. 3A-3C) at the underside of the lever 140 that is configured to selectively abut the step portion 130 of the cam 122.

The step portion 130 is configured to engage with the projection 150 when the door 106 is open. The step portion 130 may slide along the first axis and engage with the projection 150. Upon sliding along the projection 150, the step portion 130 may force the first end of the lever 140 upwards along the second axis Y while the second end of the lever is hinged at the pin 142. By elevating the second end of the lever 140, the rod 114 is elevated to actuate the switch 110 and prevent any cooking elements from remaining or becoming active while the door 106 is open. Conversely, when the door 106 is in a close position, the rod 114 is in a resting or lowered position and the switch 110 is not active, thus allowing for cooking cycles to operate.

Figure 3A:
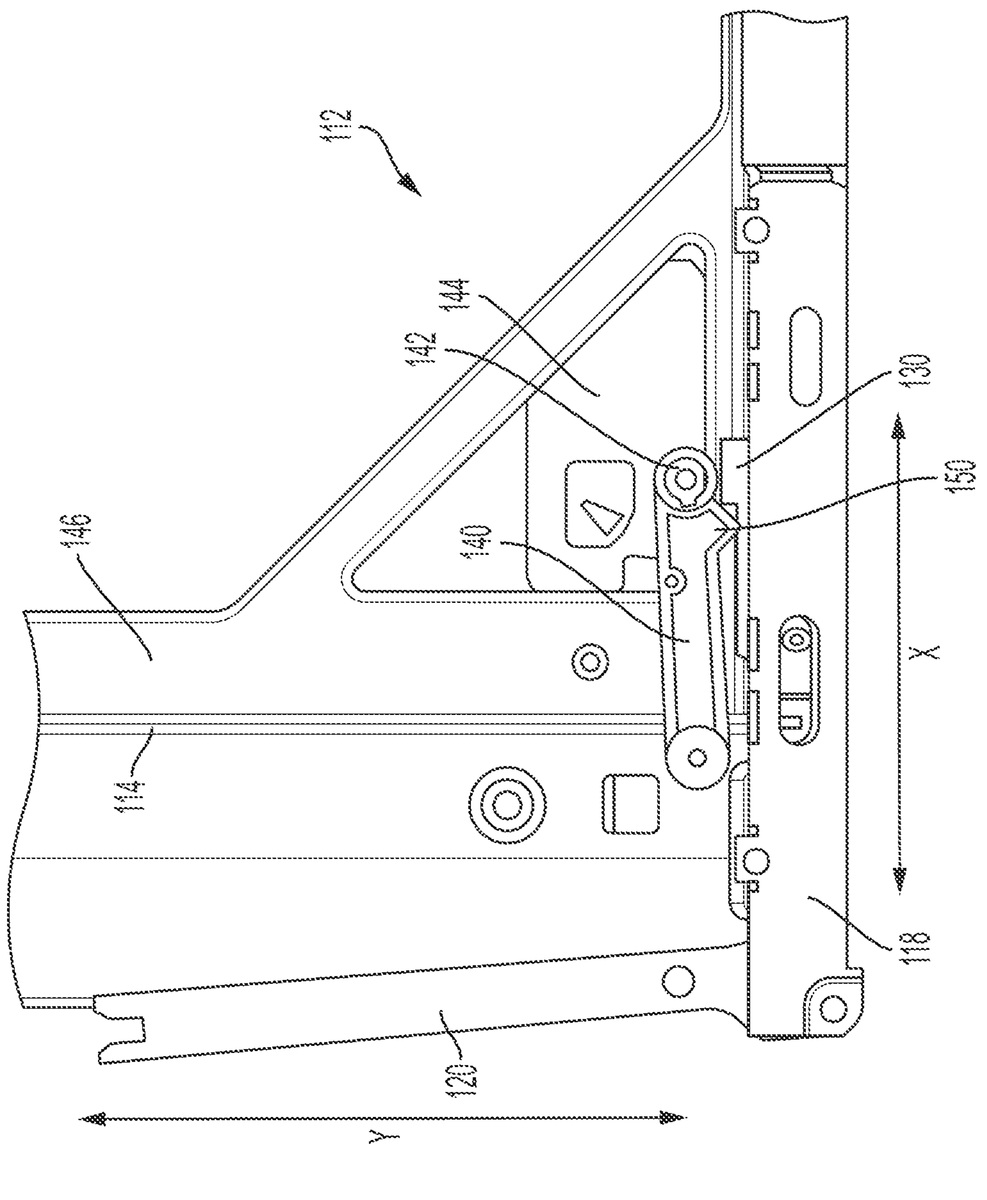
FIG. 3A illustrates a side view of a portion of the interlock system of FIG. 2, where the door is in a closed position.

FIG. 3A illustrates a side view of a portion of the interlock system 104 where the door 106 is in a closed position. In this example, the cam 122 is in a first position along the first axis where the step portion 130 is arranged below the pin 142 and does not engage with the projection 150 of the lever 140. The rod 114 is in the rest position and does not engage the switch 110 (not shown in FIG. 3A).

Figure 3B:
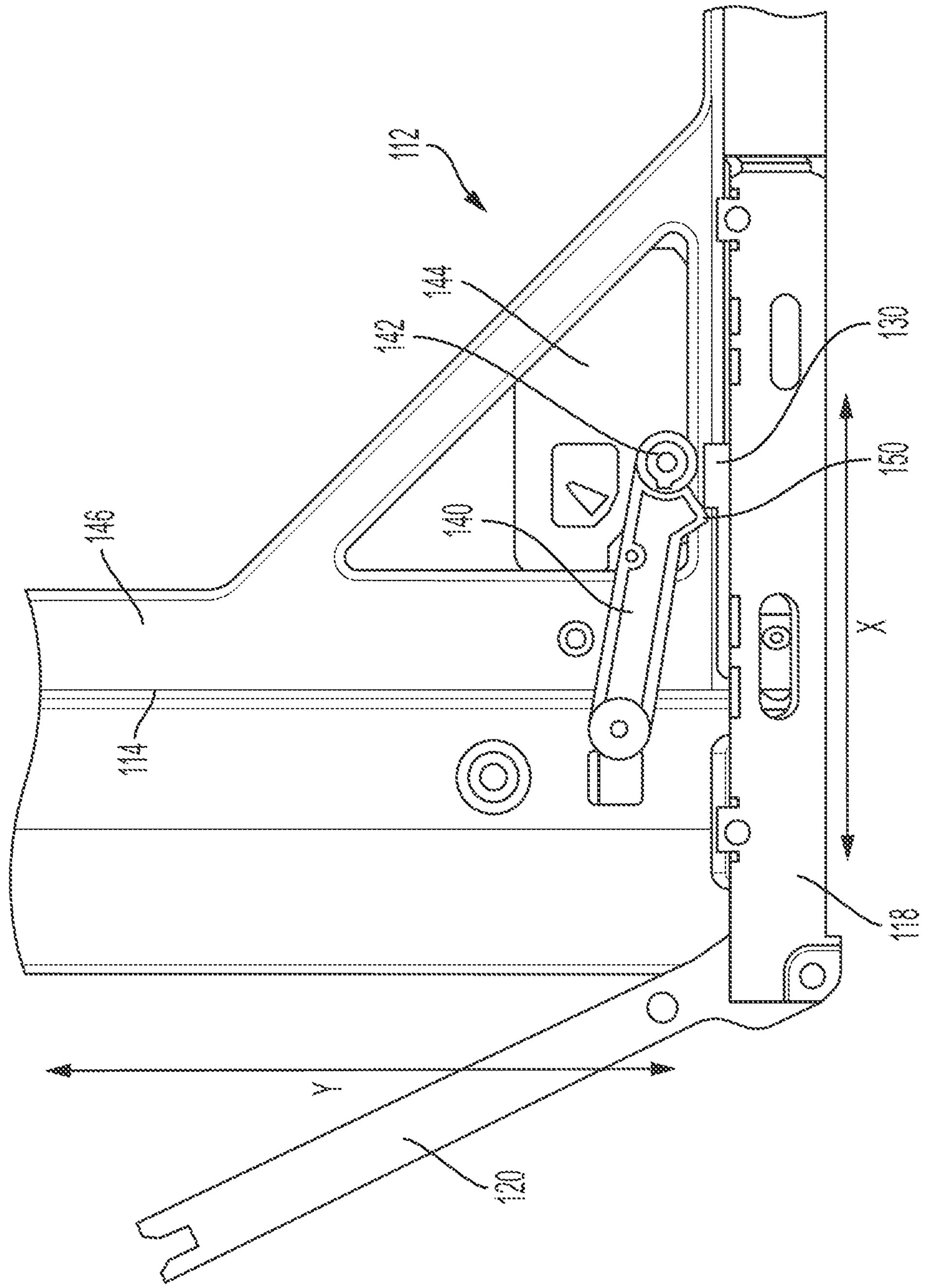
FIG. 3B illustrates a side view of a portion of the interlock system of FIG. 2, where the door is in a partially open position.
Figure 3C:
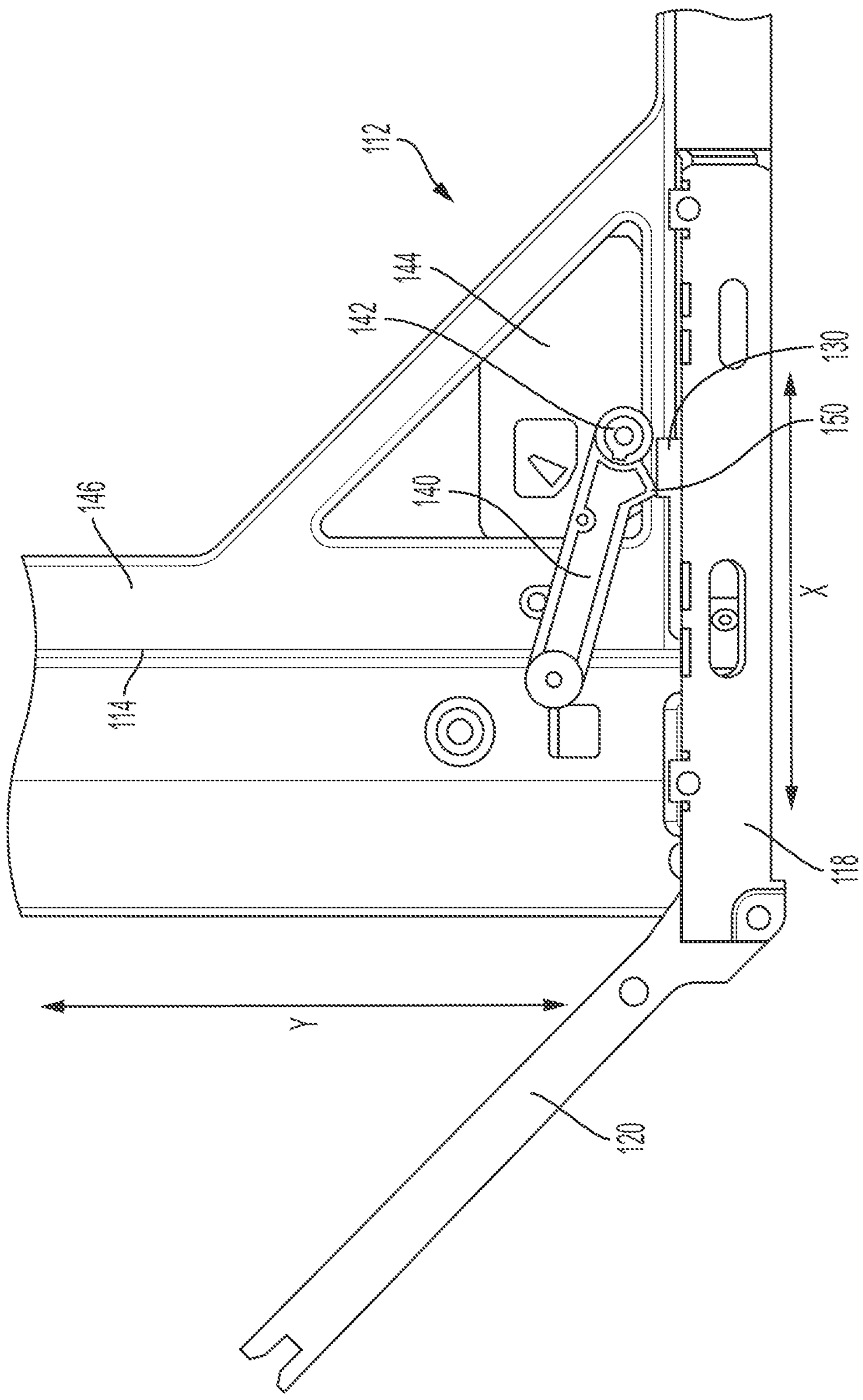
FIG. 3C illustrates a side view of a portion of the interlock system of FIG. 2, where the door is in an open position.

FIG. 3B illustrates a side view of a portion of the interlock system 104 where the door 106 is in a partially open position. In this example, the cam 122 is translated laterally along the first axis X towards the door 106 such that the step portion 130 of the cam 122 begins to engage with the projection 150 of the lever 140. Upon engaging with the projection 150, the second end of the lever 140 is forced upwards along the second axis Y. This in turn elevates the rod 114.

FIG. 3C illustrates a side view of a portion of the interlock system 104 where the door 106 is in an open position. In this example, the cam 122 is translated to a second position along the first axis X where the step portion 130 is arranged to one side of the pin 142 and is fully engaged with the projection 150 of the lever 140 so that the step portion 130 is arranged entirely, or nearly entirely, under the projection 150. In this position, the cam 122 forces the lever 140 to pivot about the pin 142, forcing the second end of the lever 140 to further elevate along the second axis Y to fully translate the rod 114.

Figure 4:
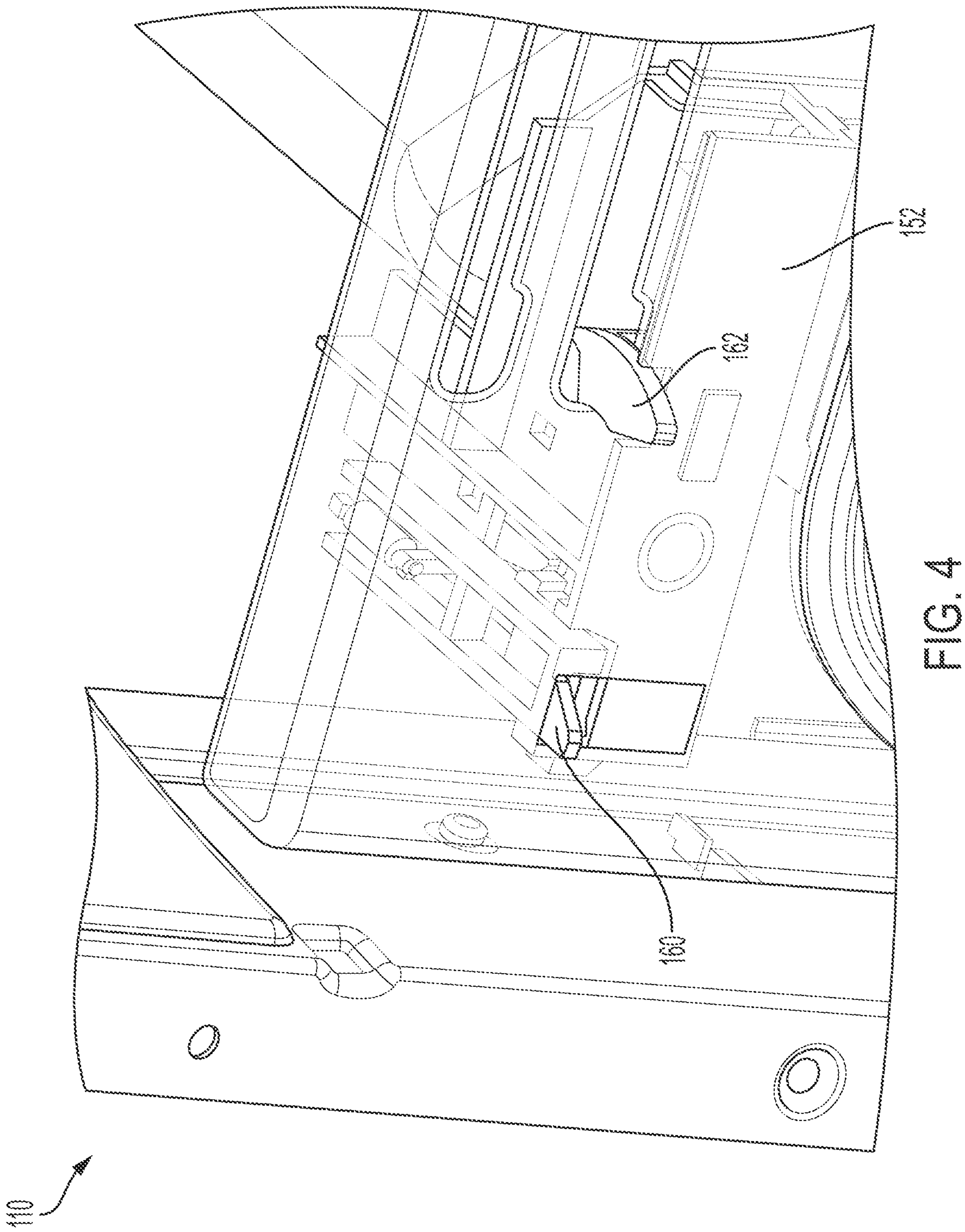
FIG. 4 illustrates an example interlock switch having a first cam and second cam.
Figure 5:
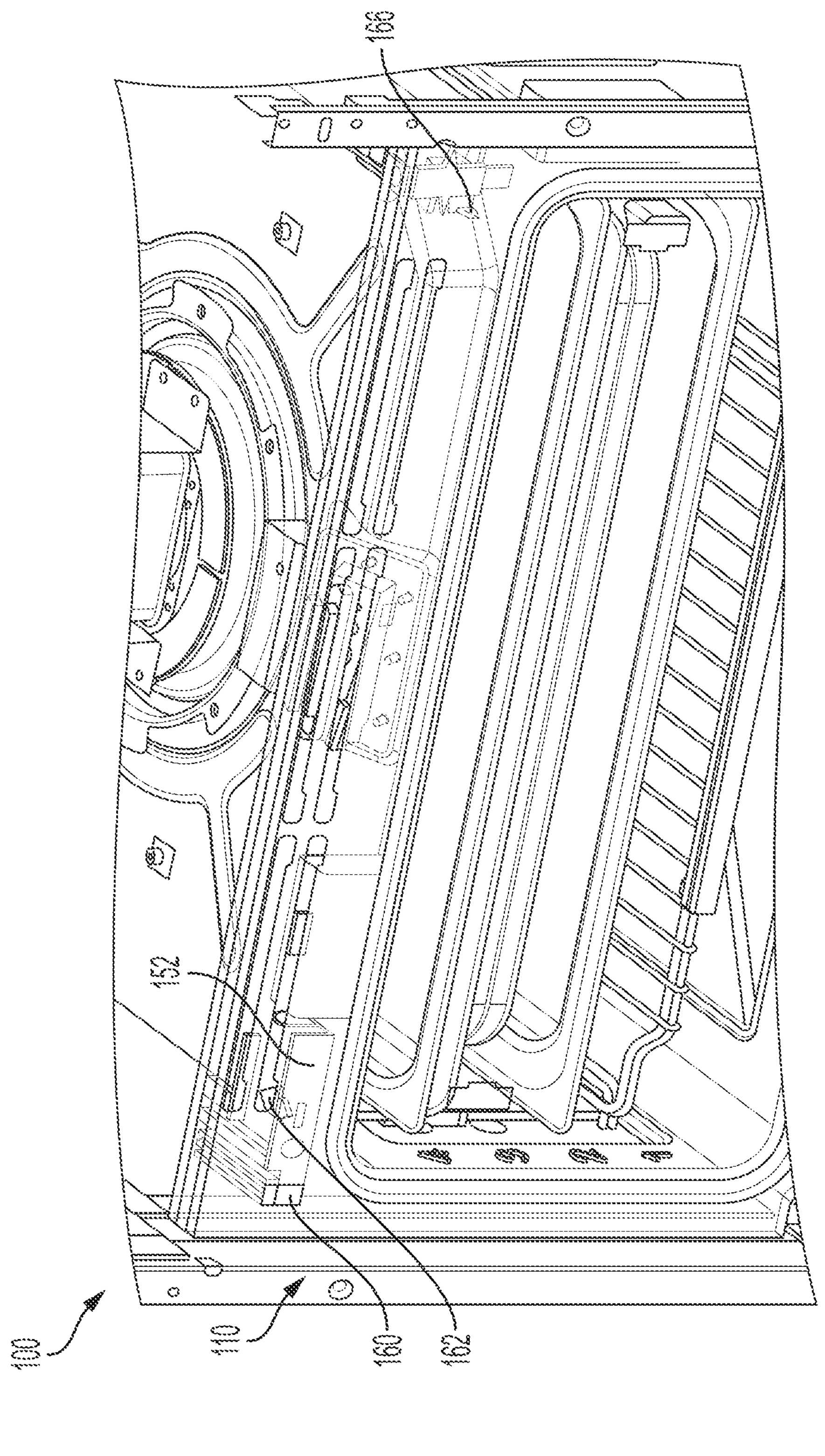
FIG. 5 illustrates a perspective view of the example interlock switch arranged at the top of the oven.

FIG. 4 illustrates an example interlock switch 110 having a first switch cam 160 and second switch cam 162. The first switch cam 160 may be spaced from the second c switch cam 162. In one example, the rod 114 (not shown in FIG. 4), may block at least one of the switch cams 160, 162. However, in another example, a plate 152, as illustrated in FIG. 5, may be attached to the rod 114 and may move vertically with the rod 114 to cause the switch cams 160, 162 to be obstructed or blocked. The only portion of the switch 110 that is accessible to a user may be a portion of the switch cams 160, 162, but can only be maneuvered with extreme force, or by taking the switch 110 apart to fully access the cams 160, 162. Accordingly, the customer cannot operate or access the switch.

FIG. 5 illustrates a perspective view of the example interlock switch 110 arranged at the top of the oven 100. A third cam 166 may be arranged at the opposite corner of the switch 110.

Figure 6:
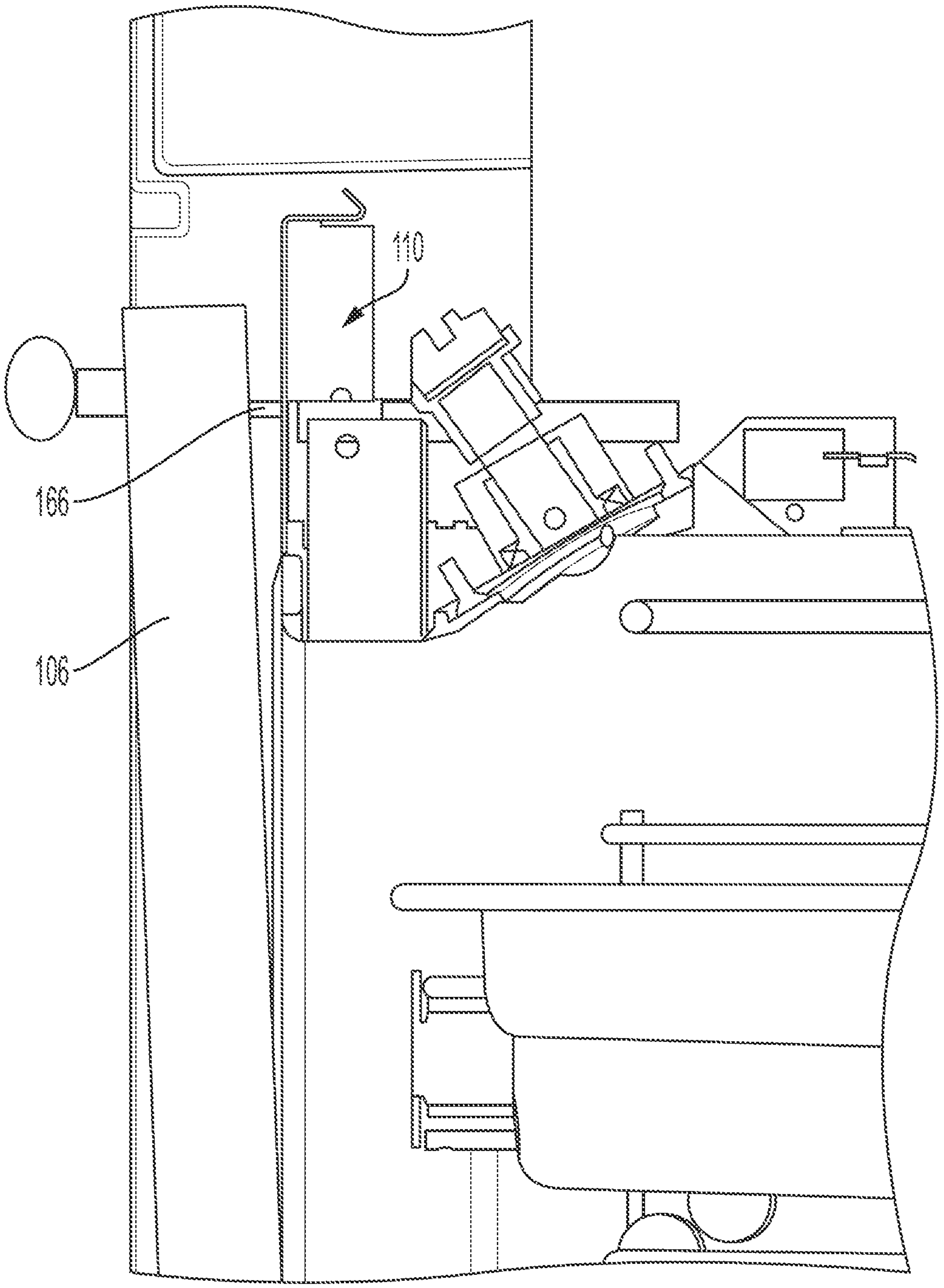
FIG. 6 illustrates a side view of the example interlock switch of FIG. 4.

FIG. 6 illustrates a side view of the example interlock switch 110 of FIG. 4. The switch 110 may be configured to lock the door and prevent the door from opening during cooking, or disallow cooking if the door is open.

In the examples shown in FIGS. 2 and 3A-C, the lever 140 is not directly connected to the hinge receiver 120. The hinge receiver 120 includes a cam 122 having a step portion 130 that moves horizontally as the door actuated. The step portion 130 is configured to rotate the lever 140 up and down. At an opposite end, the rod 126 is connected to the lever and moves up and down as the cam 122 moves laterally within the hinge receiver 120. When the door 106 is open, the lever 140 rotates to push the rod 126 upwards, which in turn blocks the first switch cam 160 and second switch cam 162. The first switch cam 160 may be arranged laterally spaced from the second switch cam 162 and be The customer cannot push or access the cams on the front frame of the oven cavity 108 because of this. Thus, when the door 106 is open, the switch cannot be triggered. The only portion of the switch 110 that is accessible is the tip of the interlock, but can only be maneuvered with extreme force. Accordingly, the customer cannot operate or access the switch.

If the door 106 is about to close, the lever 140 moves down, as does the rod 126. The rod disengages the first cam 160 and second cam 162 of the switch 110 and the switch is activated when the door is completely closed.

Thus, translation of the cam 122 towards and away from the door 106 at the cavity front frame can affect the status and activation of the switch 110. The cam 122 is housed within the reference hinge 118 and interfaces with the hinge receiver 120. The hinge receiver 120 may be fixed to the door 106 or at least translated relative to the door 106 position. The cam 122 may convert the rotational movement at the door to lateral translation via the lever 140. As the step portion 130 translates towards the front of the oven 100, the lever 140 will push the rod 114 upward to lock the switch 110. The cam allows a connection between the door opening and vertical movement of the rod 114. No additional hooks or features on the door inner surface facing the cavity are necessary, thus allowing for a better user experience.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An oven door interlock system for an oven door, comprising:

a switch;

a reference hinge attached to the oven door, the oven door movable between an open position and a closed position; and a locking mechanism connected to the switch via a rod, the locking mechanism including a hinge receiver connected to the reference hinge attached to the oven door, the reference hinge including a cam configured to move along a first axis in response to actuation at the oven door and to affect movement of the rod along a second axis perpendicular to the first axis on a position of the oven door to selectively block access to the switch when the oven door is in the open position.

2. The system of claim 1, wherein the locking mechanism includes a lever configured to rotate about a pin in response to movement of the cam along the first axis in response to the cam abutting at least a portion of the lever.

3. The system of claim 2, wherein the rod is fixed to a first end of the lever opposite the pin.

4. The system of claim 2, wherein the lever includes at least one projection configured to abut the cam and force and cause rotation of the lever about the pin in response to the oven door being in an open or partially open position.

5. The system of claim 1, wherein the cam includes a shaft and a step portion attached to the shaft.

6. The system of claim 5, wherein the hinge receiver defines a slot configured to receive the step portion and wherein the step portion of the cam is configured to translate across the slot about the first axis in response to actuation at the oven door.

7. The system of claim 6, wherein the locking mechanism includes a lever connected to the rod at a first end and having a projection and rotatably fixed to a pin at a second end.

8. The system of claim 7, wherein the step portion is configured to abut the projection and rotate the lever to translate the rod along the second axis.

9. The system of claim 1, wherein the switch includes at least one switch cam configured to selectively engage with the rod where the rod is configured to block the at least one switch cam when the oven door is in an open position.

10. The system of claim 9, wherein the at least one switch cam includes a first switch cam and a second switch cam.

11. An oven door interlock system, comprising:

a locking mechanism connected to a switch via a rod, the rod configured to selectively block the switch based on a position of an oven door, the locking mechanism including a hinge receiver connected to a reference hinge attached to the oven door, the reference hinge including a cam configured to move along a first axis in response to actuation at the oven door and to affect movement of the rod along a second axis perpendicular to the first axis on a position of the oven door to selectively block access to the switch when the oven door is in an open position.

12. The system of claim 11, wherein the reference hinge is attached and movable with the oven door, the oven door movable between the open position and a closed position.

13. The system of claim 11, wherein the locking mechanism includes a lever configured to rotate about a pin in response to movement of the cam along the first axis in response to the cam abutting at least a portion of the lever.

14. The system of claim 13, wherein the rod is fixed to a first end of the lever opposite the pin.

15. The system of claim 13, wherein the lever includes at least one projection configured to abut the cam and force and cause rotation of the lever about the pin in response to the oven door being in an open or partially open position.

16. The system of claim 11, wherein the cam includes a shaft and a step portion attached to the shaft.

17. The system of claim 16, wherein the hinge receiver defines a slot configured to receive the step portion and wherein the step portion of the cam is configured to translate across the slot about the first axis in response to actuation at the oven door.

18. The system of claim 17, wherein the locking mechanism includes a lever connected to the rod at a first end and having a projection and rotatably fixed to a pin at a second end.

19. The system of claim 18, wherein the step portion is configured to abut the projection and rotate the lever to translate the rod along the second axis.

20. The system of claim 11, wherein the switch includes at least one switch cam configured to selectively engage with the rod where the rod is configured to block the at least one switch cam when the oven door is in an open position.

* * * * *